United States Patent
He

(10) Patent No.: US 12,231,916 B2
(45) Date of Patent: Feb. 18, 2025

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Chuanfeng He, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 338 days.

(21) Appl. No.: 17/889,857

(22) Filed: Aug. 17, 2022

(65) Prior Publication Data

US 2022/0394503 A1 Dec. 8, 2022

Related U.S. Application Data

(63) Continuation of application No. PCT/CN2020/095822, filed on Jun. 12, 2020.

(51) Int. Cl.
*H04W 16/28* (2009.01)
*H04L 5/00* (2006.01)
(Continued)

(52) U.S. Cl.
CPC ........... *H04W 16/28* (2013.01); *H04L 5/0051* (2013.01); *H04W 72/1268* (2013.01); *H04W 74/0816* (2013.01)

(58) Field of Classification Search
CPC ............. H04W 16/28; H04W 72/1268; H04W 72/046; H04W 74/0816; H04W 74/0808;
(Continued)

(56) References Cited

U.S. PATENT DOCUMENTS

| | | | |
|---|---|---|---|
| 10,701,644 B2* | 6/2020 | Zhang | H04B 7/0695 |
| 11,432,333 B2* | 8/2022 | Chande | H04W 72/23 |

(Continued)

FOREIGN PATENT DOCUMENTS

| | | |
|---|---|---|
| CN | 108419266 A | 8/2018 |
| CN | 110149720 A | 8/2019 |

(Continued)

OTHER PUBLICATIONS

International Search Report Mailed Mar. 10, 2021 in Application No. PCT/CN2020/095822.

(Continued)

*Primary Examiner* — Chi H Pham
*Assistant Examiner* — Vladislav Y Agureyev
(74) *Attorney, Agent, or Firm* — PERKINS COIE LLP

(57) ABSTRACT

Embodiments of the present application provide a wireless communication method and device. A transmitter device can determine or indicate spatial information of channel listening, thereby obtaining an LBT direction and optimizing the communication of an NR-U system on a shared spectrum. The wireless communication method comprises: a transmitter device determines spatial information of channel listening according to the spatial information corresponding to first information, wherein the first information comprises a channel and/or a signal.

12 Claims, 6 Drawing Sheets

(51) Int. Cl.
*H04W 72/1268* (2023.01)
*H04W 74/0816* (2024.01)

(58) Field of Classification Search
CPC ... H04L 5/0051; H04L 5/0048; H04L 5/0023; H04L 5/0035; H04B 7/08
See application file for complete search history.

(56) References Cited

U.S. PATENT DOCUMENTS

| | | | |
|---|---|---|---|
| 11,516,684 B2* | 11/2022 | Jiang | H04B 7/0695 |
| 2018/0049014 A1* | 2/2018 | Patil | H04W 16/14 |
| 2018/0352520 A1* | 12/2018 | Zhang | H04B 7/0695 |
| 2020/0092913 A1* | 3/2020 | Xu | H04W 72/0446 |
| 2020/0100222 A1* | 3/2020 | Chakraborty | H04B 7/088 |
| 2020/0245371 A1* | 7/2020 | Chande | H04W 72/23 |
| 2020/0344819 A1* | 10/2020 | Myung | H04W 74/0841 |
| 2020/0413374 A1* | 12/2020 | Luo | H04B 7/0639 |
| 2020/0413391 A1* | 12/2020 | Luo | H04W 72/046 |
| 2021/0058967 A1* | 2/2021 | Oteri | H04W 74/0808 |
| 2021/0127419 A1* | 4/2021 | Zhang | H04W 74/0808 |
| 2021/0211908 A1* | 7/2021 | Jiang | H04L 5/0051 |
| 2021/0235491 A1* | 7/2021 | Iyer | H04W 72/23 |
| 2021/0297290 A1* | 9/2021 | Chen | H04W 72/53 |
| 2021/0392683 A1* | 12/2021 | Awadin | H04B 7/088 |
| 2022/0394684 A1* | 12/2022 | Zhang | H04W 72/20 |
| 2022/0408420 A1* | 12/2022 | Li | H04W 72/23 |
| 2024/0215064 A1* | 6/2024 | Zhang | H04B 7/0695 |

FOREIGN PATENT DOCUMENTS

| | | | | |
|---|---|---|---|---|
| CN | 110166084 A | | 8/2019 | |
| CN | 110366264 A | * | 10/2019 | H04W 74/08 |
| CN | 111107555 A | * | 5/2020 | H04L 1/08 |
| CN | 111132279 A | | 5/2020 | |
| CN | 113395764 B | * | 9/2022 | H04L 5/0048 |
| EP | 4057754 A1 | * | 9/2022 | H04L 1/08 |
| EP | 4096286 A1 | * | 11/2022 | H04W 28/0236 |
| EP | 4221434 A1 | * | 8/2023 | H04B 7/0695 |
| KR | 20200029671 A | | 3/2020 | |
| WO | 2019141099 A1 | | 7/2019 | |
| WO | WO-2019156542 A1 | * | 8/2019 | H04L 5/0055 |
| WO | WO-2019160741 A1 | * | 8/2019 | H04L 5/0048 |
| WO | WO-2019192444 A1 | * | 10/2019 | H04L 5/0023 |
| WO | 2020088477 A1 | | 5/2020 | |
| WO | 2020096322 A1 | | 5/2020 | |

OTHER PUBLICATIONS

Written Opinion Mailed Mar. 10, 2021 in Application No. PCT/CN2020/095822, 8 pages.
Huawei, HiSilicon, Coexistence and channel access for NR unlicensed band operations, 3GPP TSG RAN WG1 Meeting #96bis, R1 1903928, Xi'an, China, Apr. 8, 12, 2019, 20 pages.
Huawei, HiSilicon, Channel access mechanism for 60 GHz unlicensed operation, 3GPP TSG RAN WG1 Meeting #101-e, R1 2003294, E-meeting, May 25 Jun. 5, 2020, 7 pages.
Quectel, Discussions on Channel Access Mechanism for NR from 52.6GHz to 71GHZ, 3GPP TSG RAN WG1 #101, R1-2004303, e-Meeting, May 25-Jun. 5, 2020, 5 pages.
3GPP TS 38.214 V16.0.0 (Dec. 2019), 3rd Generation Partnership Project; Technical Specification Group Radio Access Network; NR; Physical layer procedures for data, 147 pages.
Examination Report for European Application No. 20939945.0 Issued Oct. 9, 2023, 5 Pages.
Second Office Action of the EP application No. 20939945.0, issued on Mar. 28, 2024. 4 pages.
First Office Action of the CN application No. 202211463400.7, issued on May 7, 2024. 15 pages with English translation.
Extended European Search Report for European Application No. 20939945.0 issued Jan. 3, 2023. 8 pages.
OPPO "Channel access mechanisms on NR-U" R1-1808899; 3GPP TSG RAN WG1 Meeting #94; Gothenburg, Sweden; Aug. 20-24, 2018. 3 pages.
Third Office Action of the European application No. 20939945.0, issued on Jul. 16, 2024. 6 pages.

* cited by examiner

WIRELESS COMMUNICATION METHOD AND DEVICE

CROSS-REFERENCE TO RELATED APPLICATION

The present application is a continuation application of International PCT Application No. PCT/CN2020/095822, filed on Jun. 12, 2020, the entire content of which is hereby incorporated by reference.

TECHNICAL FIELD

Embodiments of the present application relate to the field of communications, and more specifically, to a wireless communication method and a device.

BACKGROUND

In a New Radio-based access to unlicensed spectrum (NR-U) system, a spectrum used is a shared spectrum. Directional Listen Before Talk (LBT) is introduced in a communication system deploying a network on the shared spectrum such as the NR-U system. However, at the present stage, there is no relevant solution on how to obtain LBT direction information, thereby affecting communication of the NR-U system on the shared spectrum.

SUMMARY

An embodiment of the present application provides a wireless communication method and device.

In a first aspect, a wireless communication method is provided, wherein the method includes: determining, by a transmitter device, spatial information of channel listening according to spatial information corresponding to first information, wherein the first information includes a channel and/or a signal.

In a second aspect, a wireless communication method is provided, wherein the method includes: sending, by a transmitter device, indication information to a receiver device, wherein the indication information is used for indicating spatial information of channel listening through at least one type of spatial information from multiple types of spatial information.

In a third aspect, a wireless communication method is provided, wherein the method includes: receiving, by a receiver device, indication information sent by a transmitter device, wherein the indication information is used for indicating spatial information of channel listening through at least one type of spatial information from multiple types of spatial information; and determining, by the receiver device, the spatial information of channel listening according to the indication information.

In a fourth aspect, a wireless communication device is provided, configured to perform the method according to the first aspect described above.

Specifically, the device includes functional modules configured to perform the method according to the first aspect described above.

In a fifth aspect, a wireless communication device is provided, configured to perform the method according to the second aspect described above.

Specifically, the device includes functional modules configured to perform the method according to the second aspect described above.

In a sixth aspect, a wireless communication device is provided, configured to perform the method according to the third aspect described above.

Specifically, the device includes function modules configured to perform the method according to the third aspect described above.

In a seventh aspect, a wireless communication device is provided, including a processor and a memory. The memory is configured to store a computer program, and the processor is configured to call and run the computer program stored in the memory to perform the method in the first aspect described above.

In an eighth aspect, a wireless communication device is provided, including a processor and a memory. The memory is configured to store a computer program, and the processor is configured to call and run the computer program stored in the memory to perform the method in the second aspect described above.

In a ninth aspect, a wireless communication device is provided, including a processor and a memory. The memory is configured to store a computer program, and the processor is configured to call and run the computer program stored in the memory to perform the method in the third aspect described above.

In a tenth aspect, an apparatus is provided, configured to implement the method according to any one of the first to third aspects described above.

Specifically, the apparatus includes a processor, configured to call and run a computer program from a memory, so that a device disposed with the apparatus performs the method according to any one of the first to third aspects described above.

In an eleventh aspect, a computer-readable storage medium is provided, configured to store a computer program, wherein the computer program enables a computer to perform the method according to any one of the first to third aspects described above.

In a twelfth aspect, a computer program product is provided, which includes computer program instructions, wherein the computer program instructions enable a computer to perform the method according to any one of the first to third aspects described above.

In a thirteenth aspect, a computer program is provided, which, when run on a computer, enables the computer to perform the method according to any one of the first to third aspects described above.

According to the technical solution of the first aspect described above, the transmitter device may determine the spatial information of channel listening according to the spatial information corresponding to the first information, so that a reasonable and corresponding channel listening direction is determined, and channel listening is performed based on the channel listening direction, which reduces interference of channel transmission, and improves a success rate of channel access.

DETAILED DESCRIPTION

Figure 1:
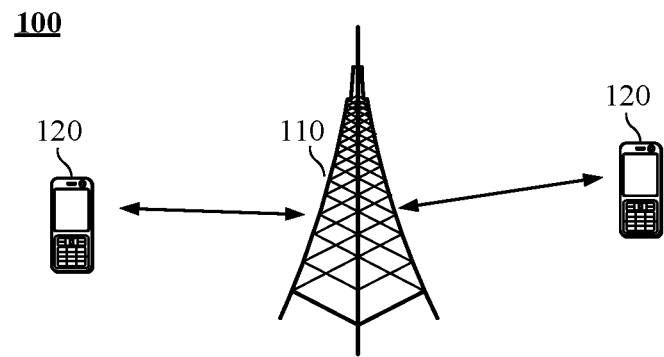
FIG. 1 is a schematic diagram of an architecture of a communication system according to an embodiment of the present application.

Technical solutions in the embodiments of the present application will be described below with reference to the accompanying drawings in the embodiments of the present application. It is apparent that the embodiments described are just a part of the embodiments of the present application, rather than all of the embodiments of the present application. According to the embodiments of the present application, all other embodiments achieved by a person of ordinary skills in the art without paying inventive efforts shall be covered by the protection scope of the present application.

Technical solutions according to embodiments of the present application may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunications System (UMTS), Wireless Local Area Networks (WLAN), Wireless Fidelity (WiFi), a 5th-generation (5G) communication system, or another communication system, etc.

Generally, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the embodiments of the present application may be applied to these communication systems as well.

Optionally, the communication system in the embodiments of the present application may be applied to a Carrier Aggregation (CA) scenario, or a Dual Connectivity (DC) scenario, or a Standalone (SA) network deployment scenario.

Optionally, the communication system in an embodiment of the present application may be applied to an unlicensed spectrum, wherein the unlicensed spectrum may also be considered as a shared spectrum; or, the communication system in the embodiment of the present application may also be applied to a licensed spectrum, wherein the licensed spectrum may also be considered as a non-shared spectrum.

Various embodiments of the present application are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc.

The terminal device may be a STATION (ST) in a WLAN, or a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a terminal device in a next generation communication system, e.g., an NR network, or a terminal device in a future evolved Public Land Mobile Network (PLMN), etc.

In an embodiment of the present application, a terminal device may be deployed on land including indoor or outdoor, handheld, wearable or vehicle-mounted terminal device; or it may be deployed on water (such as on ships, etc.); or it may be deployed aerially (such as in airplanes, balloons and satellites, etc.).

In an embodiment of the present application, the terminal device may be a mobile phone, a Pad, a computer with wireless transceiving function, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

As an example but not a limitation, in the embodiments of the present application, the terminal device may also be a wearable device. The wearable device may also be referred to as a wearable smart device, which is a general term of wearable devices, e.g., glasses, gloves, a watch, clothing, or shoes, which are intelligent designed for daily wear and developed by using wearing technologies. The wearable device is a portable device that is worn directly on a body, or integrated into clothes or an accessory of a user. The wearable device is not only a hardware device, but also achieves powerful functions through software support, data interaction, and cloud interaction. Generalized wearable smart devices include a device that is full functioned, large sized, and may achieve complete or partial functions without relying on a smart phone, such as a smart watch, or smart glasses, and include a device that only focuses on a kind of application function, and needs to be used in conjunction with another device such as a smart phone, such as various types of smart bracelets, smart jewelry, or the like, for monitoring physical signs.

In an embodiment of the present application, the network device may be a device used for communicating with a mobile device, and may be an Access Point (AP) in the WLAN, a Base Transceiver Station (BTS) in GSM or CDMA, a NodeB (NB) in WCDMA, an evolutional Node B (eNB or eNodeB) in LTE, a relay station or an access point, a vehicle-mounted device, a wearable device, a network device (gNB) in the NR network, a network device in a future evolved PLMN network, or a network device in an NTN network, etc.

As an example rather than limitation, in an embodiment of present application, the network device may be of mobility, for example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station located on land, or water, or the like.

In an embodiment of the present application, the network device may provide a service for a cell, and the terminal device communicates with the network device through a transmission resource (e.g., a frequency domain resource, which is also referred to as a spectrum resource) used by the cell, wherein the cell may be a cell corresponding to the network device (e.g., a base station), and the cell may belong to a macro base station, or may belong to a base station corresponding to a Small cell. The Small cell herein may include a Metro cell, a Micro cell, a Pico cell, or a Femto cell, etc. The Small cells are characterized by a small coverage range and a low transmission power, and are suitable for providing high-speed data transmission services.

Illustratively, a communication system 100 to which an embodiment of the present application is applied is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area.

FIG. 1 illustrates one network device and two terminal devices. Optionally, the communication system 100 may include multiple network devices, and other quantity of terminal devices may be included within the coverage area of each network device, which is not limited in the embodiments of the present application.

Optionally, the communication system 100 may also include another network entity, such as a network controller, a mobile management entity, etc., which is not limited in the embodiments of the present application.

It should be understood that a device with a communication function in a network/system in the embodiments of the present application may also be referred to as a communication device. Taking the communication system 100 shown in FIG. 1 as an example, a communication device may include a network device 110 and terminal devices 120 which have communication functions, and the network device 110 and the terminal devices 120 may be the specific devices described above, and will not be described repeatedly herein. The communication devices may also include other devices in the communication system 100, for example other network entities, such as network controllers and mobile management entities, which is not limited in the embodiments of the present application.

It should be understood that the terms "system" and "network" are often used interchangeably herein. The term "and/or" herein refers to an association relationship describing associated objects only, which indicates that three kinds of relationships may exist, for example, A and/or B may indicate three cases: A alone, both A and B at the same time, and B alone. In addition, the symbol "/" herein generally indicates that objects before and after the symbol "/" have an "or" relationship.

It should be understood that "indication" involved in embodiments of the present application may be a direct indication, may be an indirect indication, or may represent an association relationship. For example, A indicates B, which may represent that A directly indicates B, for example, B may be acquired through A; or it may represent that A indirectly indicates B, for example, A indicates C, and B may be acquired by C; or it may represent that there is an association relationship between A and B.

In the description of embodiments of the present application, the term "correspondence" may represent that there is a direct correspondence or an indirect correspondence relationship between the two, or it may represent that there is an association relationship between the two, or a relationship between the two may be a relationship of indicating and being indicated, or configuring and being configured, etc.

An unlicensed spectrum is a spectrum classified by countries and regions that can be used for communication of radio devices. This spectrum is generally regarded as a shared spectrum, that is, communication devices in different communication systems can use this spectrum without applying for an exclusive spectrum authority from the government, as long as the regulatory requirements set by countries or regions on this spectrum are met by the communication devices.

In order to enable various communication systems using an unlicensed spectrum for wireless communication to coexist friendly on this spectrum, some countries or regions have stipulated the regulatory requirements that must be met for using the unlicensed spectrum. For example, the communication device follows a "Listen Before Talk (LBT)" principle, that is, before sending a signal on a channel of the unlicensed spectrum, the communication device needs to perform channel listening first, and the communication device can send the signal only when a result of channel listening is that the channel is idle. If the result of channel listening by the communication device on the channel of the unlicensed spectrum is that the channel is busy, the communication device cannot send a signal. In order to ensure fairness, in one transmission, a duration of signal transmission by a communication device using the channel on the unlicensed spectrum cannot exceed a Maximum Channel Occupancy Time (MCOT).

In the NR-U technology, Channel Occupancy Time (COT) obtained by the base station may be shared to uplink transmission of the terminal device to use. Similarly, the COT obtained by the terminal device may also be shared to downlink transmission of the base station to use. When the base station schedules the uplink transmission of the terminal device, the base station indicates an LBT type and a channel access priority in a UL grant, according to MCOT of the base station itself, such as whether time of the scheduled uplink transmission is within the MCOT of the base station, for the terminal device to perform the LBT before the scheduled uplink transmission.

Figure 2:
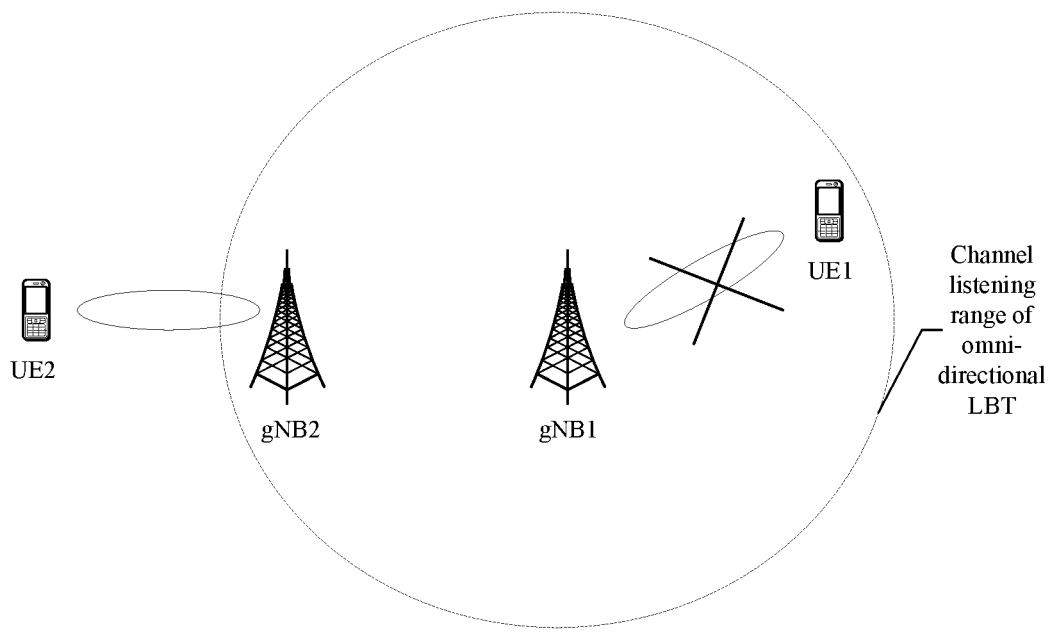
FIG. 2 is a schematic diagram of an omnidirectional LBT according to an embodiment of the present application.
Figure 3:
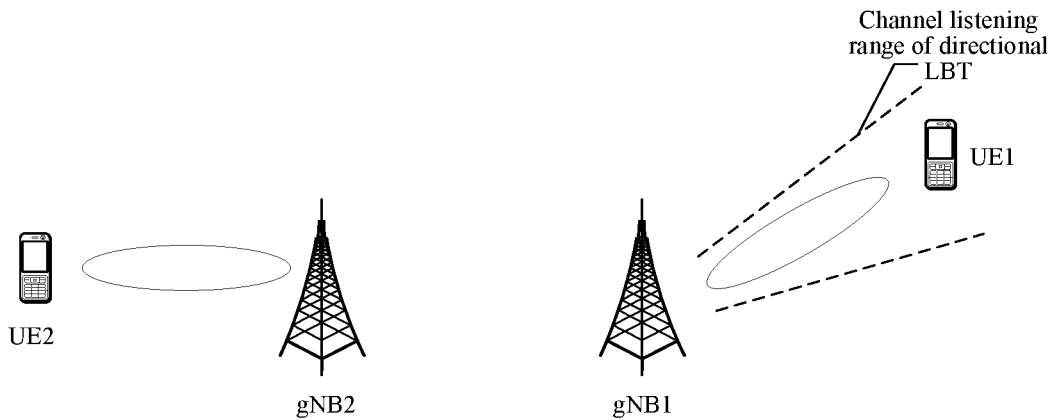
FIG. 3 is a schematic diagram of a directional LBT according to an embodiment of the present application.

In subsequent technical evolution, the use of the unlicensed spectrum in a higher frequency band and related technologies will be considered, such as 52.6 GHz-71 GHz discussed in the release 17 (Rel-17) standard. In a high frequency band, since a beam of signal sending is narrower and more directional, when channel listening is performed, compared with omnidirectional channel listening in a low frequency band, a relatively ideal mode is to use directional channel listening, that is, directional LBT. When the channel is found to be idle after channel listening is performed using the directional LBT, the signal may be sent through the beam in this direction to occupy the channel. Compared with the omnidirectional LBT, the directional LBT may increase an access opportunity, because channel occupation in different beam directions may be performed simultaneously through space division multiplexing. As shown in FIG. 2, when gNB1 uses the omnidirectional LBT, transmission of gNB2 affects a result of channel listening of the gNB1, so that the result of channel listening by gNB1 is non-idle, and the channel cannot be occupied for transmission to UE1. As shown in FIG. 3, when the gNB1 uses the directional LBT, channel listening is performed in a spatial direction of transmission to the UE1. In this case, since transmission from gNB2 to UE2 also has directivity, the result of channel listening by the gNB1 is not affected, so that the result of channel listening by the gNB1 is idle, and the channel may be occupied for transmission to the UE1.

However, at present, there is no relevant solution on how to determine and acquire LBT direction information, thereby affecting communication of the NR-U system on the shared spectrum.

Based on the above problem, the present application proposes a solution for determining LBT direction information, which can determine a reasonable and corresponding direction of LBT, and perform channel listening, reducing interference of channel transmission, and improving a success rate of channel access. And the present application provides a solution for indicating LBT direction information, which determines spatial information used for indicating LBT direction information, so that the indicated direction of LBT is more reasonable and accurate, which reduces interference of channel transmission, and improves the success rate of channel access.

Technical solutions of the present application will be described in detail below with specific embodiments.

Figure 4:
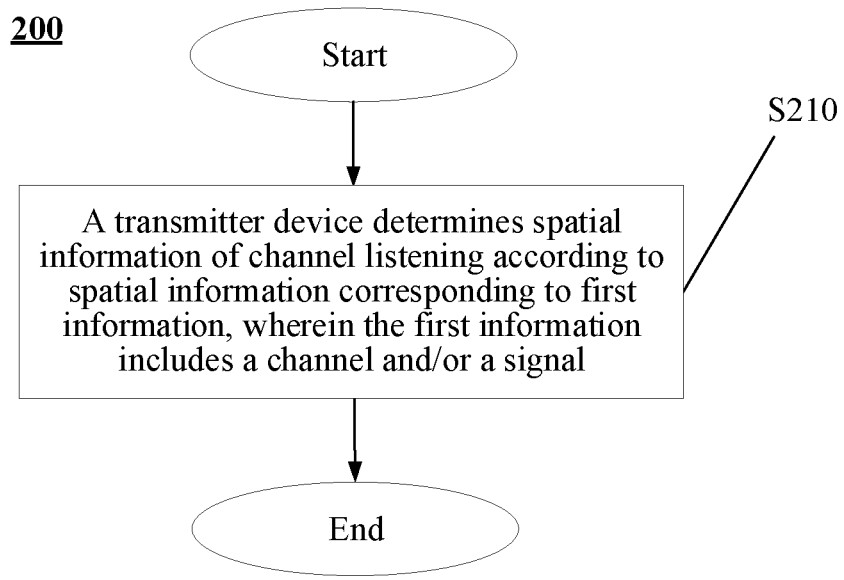
FIG. 4 is a schematic flow chart of a wireless communication method according to an embodiment of the present application.

FIG. 4 is a schematic flow chart of a wireless communication method 200 according to an embodiment of the present application. As shown in FIG. 4, the method 200 may include at least part of the following contents.

In S210, a transmitter device determines spatial information of channel listening according to spatial information corresponding to first information, wherein the first information includes a channel and/or a signal.

Optionally, the spatial information of channel listening may be LBT direction information, or the spatial information of channel listening may be used for determining a direction of LBT.

It should be noted that, in the embodiment of the present application, after determining the direction of LBT, the transmitter device performs channel listening in the direction of LBT, and if a result of the channel listening is idle, the channel may be occupied through sending a signal or a channel using a beam in the direction of LBT.

In an embodiment of the present application, the transmitter device may be a terminal device, or the transmitter device may be a network device. In addition, the first information may be an uplink channel and/or an uplink signal, or the first information may be a downlink channel and/or a downlink signal.

In an embodiment of the present application, the first information may be information to be sent, such as a signal to be sent, or a channel to be sent, etc. In addition, the first information may also be some other information, such as a signal that has been sent, or a channel that has been sent, etc.

In the embodiment of the present application, the transmitter device may determine the spatial information of channel listening according to the spatial information corresponding to the first information, so that a reasonable and corresponding channel listening direction is determined, and the channel listening is performed based on the channel listening direction, which reduces interference of channel transmission, and improves the success rate of channel access.

Optionally, in an embodiment of the present application, the spatial information corresponding to the first information includes at least one of the followings: Synchronization Signal Block (SSB) index information, a Transmission Configuration Indicator (TCI) state identification, spatial information of a Channel State Information Reference Signal (CSI-RS), spatial information of an uplink Sounding Reference Signal (SRS), spatial information of a Physical Uplink Control Channel (PUCCH), or spatial information of a Physical Uplink Shared Channel (PUSCH).

It should be noted that one SSB is used for carrying a synchronization signal and broadcast channel of one beam. That is to say, the SSB may also be called a synchronization signal/physical broadcast channel block (SS/PBCH block).

That is, in an embodiment of the present application, the SSB index information, the TCI state identification, or the spatial information of the CSI-RS, etc., may be used as spatial information for determining channel listening.

Optionally, the SSB index information includes at least one of the followings: an SSB index, or a candidate SSB index.

Optionally, in some embodiments, the spatial information corresponding to the first information includes the SSB index information, i.e., the transmitter device determines the spatial information of channel listening according to the SSB index information. For example, the transmitter device is a network device, and it determines the spatial information (such as the direction of LBT) of channel listening by using a spatial filter corresponding to the SSB index information. For another example, the transmitter device is the terminal device, and it determines the spatial information (such as the direction of LBT) of channel listening by using the spatial filter corresponding to the received SSB index information.

Figure 5:
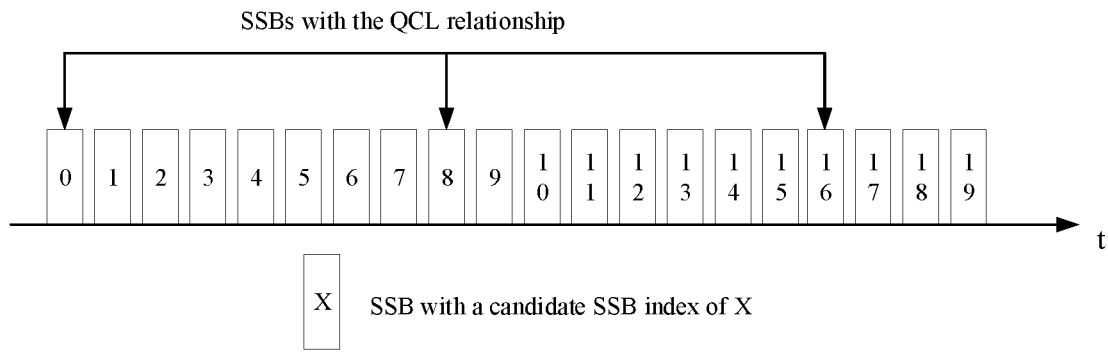
FIG. 5 is a schematic diagram of a correspondence relationship between a candidate SSB index and an SSB index according to an embodiment of the present application.

It should be noted that a subcarrier interval of an SSB may be 15 KHz or 30 KHz, and there are Y=10 and Y=20 candidate sending locations within a transmission window of 5 ms, respectively. Each candidate sending location has a corresponding candidate SSB index, wherein the candidate SSB index is carried in a Physical Broadcast Channel (PBCH), and the candidate SSB index is used for the terminal device to obtain synchronization according to the candidate SSB index. For example, the terminal device obtains a candidate SSB index through the received SSB, and obtains Quasi-co-located (QCL) relationship information of the SSB based on the candidate SSB index. The approach for obtaining the QCL relationship information of the SSB based on the candidate SSB index may have the following two modes: Mode 1, SSBs with the same result of candidate SSB indices mod Q have a QCL relationship; Mode 2, SSBs with the same result of the least significant three bits of candidate SSB indices mod Q, that is, SSBs with the same result of PBCH Demodulation Reference Signal (DMRS) sequence indices mod Q, have the QCL relationship. Taking Q=8 as an example, as shown in FIG. 5, SSBs with candidate SSB indices of 0, 8, and 16 have the QCL relationship. The value of Q may be 1, 2, 4, or 8. The network device may carry the parameter Q through the PBCH, or the network device carries the parameter Q through a system message, and the network device dynamically indicates the parameter Q to the terminal device. When the terminal device receives the SSB, the terminal device may obtain QCL information of the SSB according to the indicated Q and the candidate SSB index. The SSBs having the QCL relationship may be processed jointly to improve performance. The result of the candidate SSB index mod Q is an SSB index defined in the NR-U system, and one SSB index may correspond to a group of candidate SSB indices.

Optionally, in multiple SSBs occupying different resources in the time domain, SSBs with the same SSB index have a QCL relationship, and SSBs having the QCL relationship correspond to the same spatial information (such as the direction of LBT) of channel listening.

Optionally, in multiple candidate SSB indices, candidate SSB indices corresponding to the same SSB index have a QCL relationship, and candidate SSB indices having the QCL relationship are used for determining the same spatial information (such as the direction of LBT) of channel listening.

It should be noted that when two reference signals (SSB indices or candidate SSB indices) have the QCL relationship, it may be considered that large-scale parameters (such as doppler delay, average delay, spatial reception parameters, etc.) of the two reference signals may be inferred from each other, or are similar. Filtering processing may be performed on the SSBs having the QCL relationship during measurement, as a beam level measurement result. In this mode, when sending and receiving a channel or a signal, the network device may determine corresponding sending and receiving beams according to an SSB (an SSB index) associated with the channel or the signal. In other words, the SSB (the SSB index) provides one reference to the sending and receiving beams of the network device for determining beams performing channel and signal transmission with the terminal device.

Optionally, in some embodiments, the spatial information corresponding to the first information includes a TCI state identification, i.e., the transmitter device determines the spatial information of channel listening according to the TCI state identification. For example, the transmitter device is a network device, and it uses the QCL information corresponding to the TCI state identification to determine the spatial information (such as the direction of LBT) of channel listening. For another example, the transmitter device is the terminal device, and it uses the QCL information corresponding to the received TCI state identification to determine the spatial information (such as the direction of LBT) of channel listening.

Optionally, a TCI state identified by the TCI state identification is configured with the QCL information.

It should be noted that the network device configures several TCI states through a Radio Resource Control (RRC) signaling, wherein each TCI state has one ID. The QCL information configured by each TCI state represents a spatial information.

In some scenarios, the TCI state is used for representing the QCL relationship between an SSB or a CSI-RS resource and a Physical Downlink Shared Channel (PDSCH) DMRS port, or the TCI state is used for representing the QCL relationship between the SSB or the CSI-RS resource and a Physical Downlink Control Channel (PDCCH) DMRS port. Before transmitting a downlink data channel, the network device will indicate a corresponding QCL signal to the terminal device through the TCI state, so that the terminal device may receive a corresponding downlink channel by using the receiving beam used for receiving the QCL signal earlier.

Optionally, the TCI state identification is an identification of an activated TCI state.

It should be noted that the TCI state may be activated and deactivated through a Media Access Control Control Element (MAC CE). The spatial information corresponding to the TCI state identification represents the spatial information corresponding to the SSB index contained in a TCI state configuration, such as the corresponding spatial filter. Optionally, the spatial information corresponding to the TCI state identification represents the spatial information corresponding to a CSI-RS resource index contained in the TCI state configuration, such as a corresponding spatial filter.

It should be noted that the network device contains the QCL information in a CSI-RS resource configuration, and the QCL information contained in the CSI-RS resource configuration may be represented as a spatial information. In addition, the CSI-RS in the embodiment of the present application may be a Non-Zero Power Channel State Information-Reference Signal (NZP-CSI-RS).

Optionally, in an embodiment of the present application, since the spatial information of the CSI-RS (such as the QCL information) is contained in the CSI-RS resource configuration, there is a correspondence relationship between a CSI-RS resource identification and the spatial information of the CSI-RS. In other words, the spatial information of the CSI-RS may correspond to the CSI-RS resource identification, that is, the transmitter device may also determine the spatial information (such as the direction of LBT) of channel listening based on the CSI-RS resource identification corresponding to the first information.

Optionally, in an embodiment of the present application, since spatial information of an uplink SRS is contained in an uplink SRS resource configuration, there is a correspondence relationship between an uplink SRS resource indicator and the spatial information of the uplink SRS, that is, the spatial information of the uplink SRS may correspond to the uplink SRS resource indicator. In other words, the transmitter device may also determine the spatial information (such as the direction of LBT) of channel listening based on the uplink SRS resource indicator corresponding to the first information.

Optionally, in an embodiment of the present application, since spatial information of the PUCCH is contained in a PUCCH resource configuration, there is a correspondence relationship between a PUCCH resource identification and the spatial information of the PUCCH, that is, the spatial information of the PUCCH may correspond to the PUCCH resource identification. In other words, the transmitter device may also determine the spatial information (such as the direction of LBT) of channel listening based on the PUCCH resource identification corresponding to the first information.

Optionally, in an embodiment of the present application, spatial information of the PUSCH is indicated by at least one of an SRS resource indicator, precoding information, information of the number of layers, or a Scheduling Request Indication (SRI).

Optionally, in some embodiments, specifically the above S210 may be as follows: the transmitter device determines the spatial information of channel listening according to spatial information of the first information or spatial information corresponding to a type of the first information.

when the first information is information to be sent, specifically the above S210 may be as follows: the transmitter device determines the spatial information of channel listening corresponding to the information to be sent according to spatial information of the information to be sent or spatial information corresponding to a type of the information to be sent.

It should be noted that "the spatial information of channel listening corresponding to the information to be sent" may also be called "the channel-listening spatial information which is sent for the information to be sent". Similarly, "the direction of LBT corresponding to the information to be sent" may also be called "the LBT direction which is sent for the information to be sent".

Optionally, in some embodiments, when the first information is the information to be sent, specifically the above S210 may be as follows: the transmitter device determines the spatial information of channel listening corresponding to the information to be sent according to the spatial information corresponding to the information to be sent and the type of the information to be sent, or determines the direction of LBT corresponding to the information to be sent according to the spatial information corresponding to the information to be sent and the type of the information to be sent.

Optionally, in an embodiment of the present application, each type of first information corresponds to one type of spatial information; and/or, multiple types of first information correspond to one type of spatial information.

For example, in a case that the first information is the PDCCH, the spatial information corresponding to the first information is SSB index information, and in a case that the first information is the PDSCH, the spatial information corresponding to the first information is also the SSB index information. That is, multiple types of first information correspond to one type of spatial information.

For another example, in a case that the first information is the PDCCH, the spatial information corresponding to the first information is a TCI state identification, and in a case that the first information is the PDSCH, the spatial information corresponding to the first information is also the TCI state identification. That is, multiple types of first information correspond to one type of spatial information.

For another example, in a case that the first information is the PDCCH, the spatial information corresponding to the first information is spatial information of the CSI-RS, and in a case that the first information is the PDSCH, the spatial information corresponding to the first information is also the spatial information of the CSI-RS. That is, multiple types of first information correspond to one type of spatial information.

For another example, in a case that the first information is the PDCCH, the spatial information corresponding to the first information is SSB index information, and in a case that the first information is the PDSCH, the spatial information corresponding to the first information is the TCI state identification. That is, each type of first information corresponds to one type of spatial information.

For another example, in a case that the first information is the PDCCH, the spatial information corresponding to the first information is the SSB index information, and in a case that the first information is the PDSCH, the spatial information corresponding to the first information is the spatial information of the CSI-RS. That is, each type of first information corresponds to one type of spatial information.

For another example, in a case that the first information is the PDCCH, the spatial information corresponding to the first information is the TCI state identification, and in a case that the first information is the PDSCH, the spatial information corresponding to the first information is the spatial information of the CSI-RS. That is, each type of first information corresponds to one type of spatial information.

For another example, in a case that the first information is the PUCCH, the spatial information corresponding to the first information is the spatial information of the uplink SRS, and in a case that the first information is the PUSCH, the spatial information corresponding to the first information is spatial information of the PUSCH. That is, each type of first information corresponds to one type of spatial information.

For another example, in a case that the first information is the PUCCH, the spatial information corresponding to the first information is spatial information of the PUCCH, and in a case that the first information is the PUSCH, the spatial information corresponding to the first information is the spatial information of the PUSCH. That is, each type of first information corresponds to one type of spatial information.

Optionally, in some embodiments, the spatial information of channel listening includes a direction of uplink LBT and a direction of downlink LBT. A type of spatial information used for determining the direction of uplink LBT is the same as a type of spatial information used for determining the direction of downlink LBT; or, a type of spatial information used for determining the direction of uplink LBT is different from a type of spatial information used for determining the direction of downlink LBT.

For example, the spatial information used for determining the direction of uplink LBT and the spatial information used for determining the direction of downlink LBT are both the SSB index.

For another example, the spatial information used for determining the direction of uplink LBT is the spatial information of the uplink SRS, and the spatial information used for determining the direction of downlink LBT is the SSB index.

Therefore, in the embodiment of the present application, the transmitter device may determine the spatial information of channel listening according to the spatial information corresponding to the first information, so that a reasonable and corresponding channel listening direction is determined, and a channel listening is performed based on the channel listening direction, which reduces interference of channel transmission, and improves the success rate of channel access.

Figure 6:
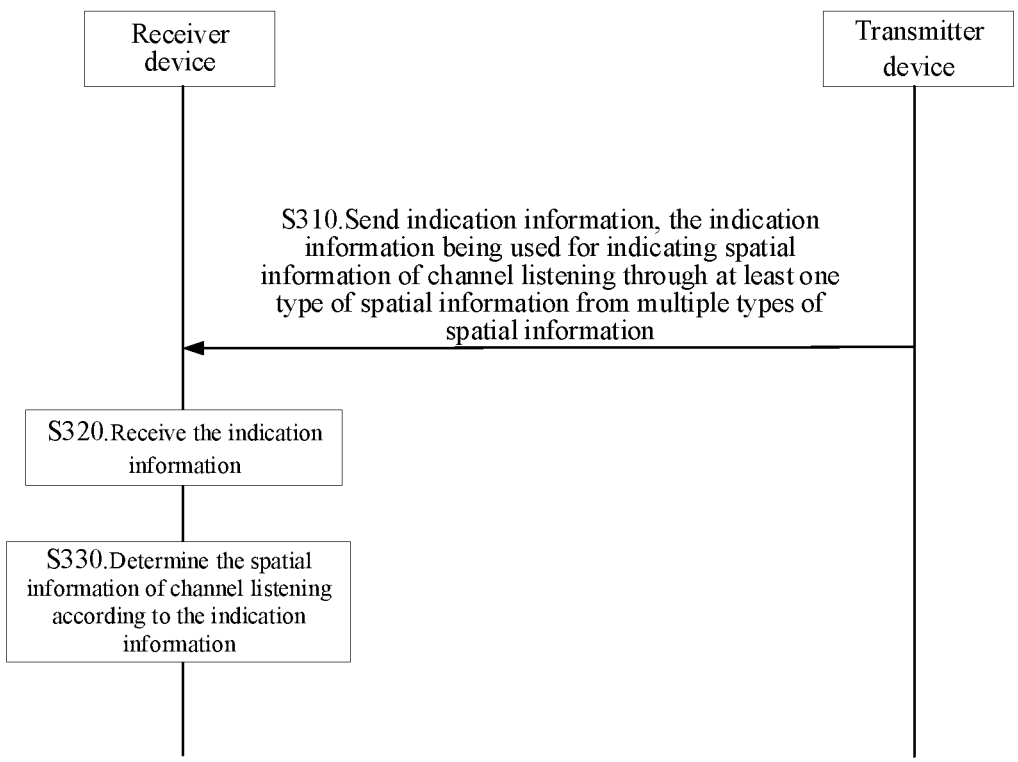
FIG. 6 is a schematic flow chart of another wireless communication method according to an embodiment of the present application.

FIG. 6 is a schematic flow chart of a wireless communication method 300 according to an embodiment of the present application. As shown in FIG. 6, the method 300 may include at least part of the following contents.

In S310, a transmitter device sends indication information to a receiver device, wherein the indication information is used for indicating spatial information of channel listening through at least one type of spatial information from multiple types of spatial information.

In S320, the receiver device receives the indication information sent by the transmitter device.

In S330, the receiver device determines the spatial information of channel listening according to the indication information.

Optionally, the spatial information of channel listening may be LBT direction information, or the spatial information of channel listening may be used for determining a direction of LBT.

It should be noted that, in the embodiment of the present application, after determining the direction of LBT, the receiver device performs channel listening in the direction of LBT, and if a result of the channel listening is idle, a channel may be occupied through sending a signal or a channel using a beam in the direction of LBT.

It should be noted that, in the embodiment of the present application, the direction of LBT may be a direction of LBT in which the transmitter device has completed channel listening, or a direction in which the receiver device needs to perform LBT before sending information to be sent.

In an embodiment of the present application, the transmitter device may be a terminal device, or the transmitter device may be a network device.

In an embodiment of the present application, the indication information is used for indicating the spatial information of channel listening through at least one type of spatial information from the multiple types of spatial information, so that the indicated channel listening direction is more reasonable and accurate. Furthermore, performing channel listening based on the spatial information of channel listening may reduce interference of channel transmission, and improve the success rate of channel access.

Optionally, in an embodiment of the present application, the multiple types of spatial information include at least two of the followings: SSB index information, a TCI state identification, spatial information of a CSI-RS, spatial information of an uplink SRS, spatial information of a PUCCH, or spatial information of a PUSCH.

It should be noted that one SSB is used for carrying a synchronization signal and broadcast channel of one beam. That is, the SSB may also be called an SS/PBCH block.

In other words, in an embodiment of the present application, the SSB index information, the TCI state identification, the spatial information of the CSI-RS, or the like may be used as spatial information to indicate the spatial information (e.g. the direction of LBT) of channel listening.

Optionally, the SSB index information includes at least one of the followings: an SSB index, or a candidate SSB index.

It should be noted that a subcarrier interval of the SSB may be 15 KHz or 30 KHz, and there are Y=10 and Y=20 candidate sending locations within a transmission window of 5 ms, respectively. Each candidate sending location has a corresponding candidate SSB index, wherein the candidate SSB index is carried in a PBCH, and the candidate SSB index is used for the terminal device to obtain synchronization according to the candidate SSB index. For example, the terminal device obtains the candidate SSB index through the received SSB, and obtains QCL relationship information of the SSB based on the candidate SSB index. The approach for obtaining the QCL relationship information of the SSB based on the candidate SSB index may have the following two modes: Mode 1, SSBs with the same result of candidate SSB indices mod Q have a QCL relationship; Mode 2, SSBs with the same result of the least significant three bits of candidate SSB indices mod Q, that is, SSBs with the same result of PBCH DMRS sequence indices mod Q, have the QCL relationship. Taking Q=8 as an example, as shown in FIG. 5, SSBs with candidate SSB indices of 0, 8, and 16 have the QCL relationship. The value of Q may be 1, 2, 4, or 8. The network device may carry the parameter Q through the PBCH, or the network device carries the parameter Q through a system message, and the network device dynamically indicates the parameter Q to the terminal device. When the terminal device receives the SSB, the terminal device may obtain QCL information of the SSB according to the indicated Q and the candidate SSB index. The SSBs having the QCL relationship may be processed jointly to improve performance. The result of the candidate SSB index mod Q is an SSB index defined in the NR-U system, and one SSB index may correspond to a group of candidate SSB indices.

Optionally, in multiple SSBs occupying different resources in the time domain, SSBs with the same SSB index have a QCL relationship, and SSBs having the QCL relationship correspond to the same spatial information (such as the direction of LBT) of channel listening.

Optionally, in multiple candidate SSB indices, candidate SSB indices corresponding to the same SSB index have a QCL relationship, and candidate SSB indices having the QCL relationship are used for determining the same spatial information (such as the direction of LBT) of channel listening.

It should be noted that when two reference signals (SSB indices or candidate SSB indices) have the QCL relationship, it may be considered that large-scale parameters (such as doppler delay, average delay, spatial reception parameters, etc.) of the two reference signals may be inferred from each other, or are similar. Filtering processing may be performed on the SSBs having the QCL relationship during measurement, as a beam level measurement result. In this mode, when sending and receiving a channel or a signal, the network device may determine corresponding sending and receiving beams according to an SSB (an SSB index) associated with the channel or the signal. In other words, the SSB (the SSB index) provides one reference to the sending and receiving beams of the network device for determining beams performing channel and signal transmission with the terminal device.

Optionally, a TCI state identified by the TCI state identification is configured with the QCL information.

It should be noted that the network device configures several TCI states through an RRC signaling, and each TCI state has one ID. The QCL information configured by each TCI state represents a spatial information.

In some scenarios, the TCI state is used for representing the QCL relationship between an SSB or a CSI-RS resource and a PDSCH DMRS port, or the TCI state is used for representing the QCL relationship between the SSB or the CSI-RS resource and a PDCCH DMRS port. Before transmitting a downlink data channel, the network device will indicate a corresponding QCL signal to the terminal device through the TCI state, so that the terminal device may receive a corresponding downlink channel by using the receiving beam used for receiving the QCL signal earlier.

Optionally, the TCI state identification is an identification of an activated TCI state.

It should be noted that the TCI state may be activated and deactivated through an MAC CE. Spatial information corresponding to the TCI state identification represents spatial information corresponding to the SSB index contained in a TCI state configuration, such as a corresponding spatial filter. Optionally, the spatial information corresponding to the TCI state identification represents spatial information corresponding to a CSI-RS resource index contained in the TCI state configuration, such as the corresponding spatial filter.

Optionally, QCL information is contained in a CSI-RS resource configuration, and the QCL information contained in the CSI-RS resource configuration may be represented as a spatial information.

It should be noted that the CSI-RS corresponding to the spatial information of the CSI-RS may be an NZP-CSI-RS.

Optionally, in an embodiment of the present application, since the spatial information of the CSI-RS (such as the QCL information) is contained in the CSI-RS resource configuration, there is a correspondence relationship between a CSI-RS resource identification and the spatial information of the CSI-RS, that is, the spatial information of the CSI-RS may correspond to the CSI-RS resource identification. In other words, the indication information may also indicate the spatial information (such as the direction of LBT) of channel listening through the CSI-RS resource identification.

Optionally, in an embodiment of the present application, since spatial information of an uplink SRS is contained in an uplink SRS resource configuration, there is a correspondence relationship between an uplink SRS resource indicator and the spatial information of the uplink SRS, that is, the spatial information of the uplink SRS may correspond to the uplink SRS resource indicator. In other words, the indication information may also indicate the spatial information (such as the direction of LBT) of channel listening through the uplink SRS resource indicator.

Optionally, in an embodiment of the present application, since spatial information of a PUCCH is contained in a PUCCH resource configuration, there is a correspondence relationship between a PUCCH resource identification and the spatial information of the PUCCH, that is, the spatial information of the PUCCH may correspond to the PUCCH resource identification. In other words, the indication information may also indicate the spatial information (such as the direction of LBT) of channel listening through the PUCCH resource identification.

Optionally, in an embodiment of the present application, the spatial information of the PUSCH is indicated by at least one of an SRS resource indicator, precoding information, information of the number of layers, or an SRI.

Optionally, in an embodiment of the present application, the indication information may be carried in at least one of the following information: Downlink Control Information (DCI) used for uplink grant, DCI used for indicating COT information, second information (message 2, Msg 2) in a four-step random access, uplink control information (UCI) carried in a Configured Grant Uplink (CG-UL).

Figure 7:
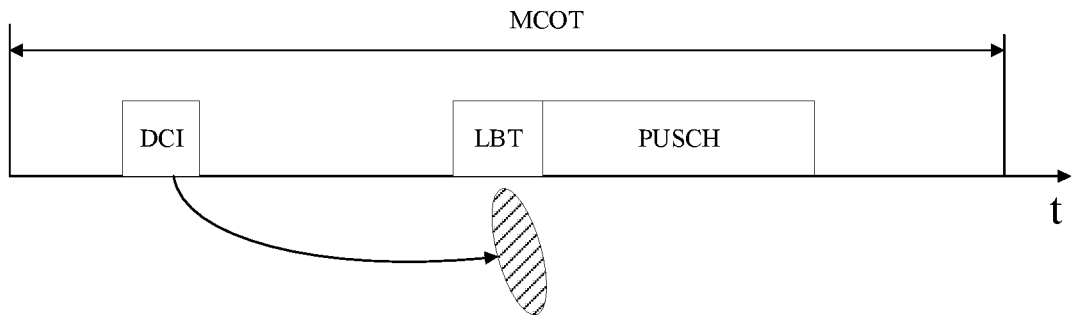
FIG. 7 is a schematic diagram of control information carrying indication information according to embodiments of the present application respectively.

For example, as shown in FIG. 7, in a COT sharing scenario, the network device carries the indication information in the DCI used for uplink grant, wherein the indication information is used for indicating the spatial information (such as the direction of LBT) of channel listening before PUSCH transmission scheduled by the DCI. The indication information may, for example, indicate the spatial information (such as the direction of LBT) of channel listening through the spatial information of the PUSCH. After receiving the DCI, the terminal device determines the direction of LBT based on the indication information, performs channel listening according to the direction of LBT, and transmits the PUSCH through a beam in the direction of LBT when a result of the channel listening is idle.

Figure 8:
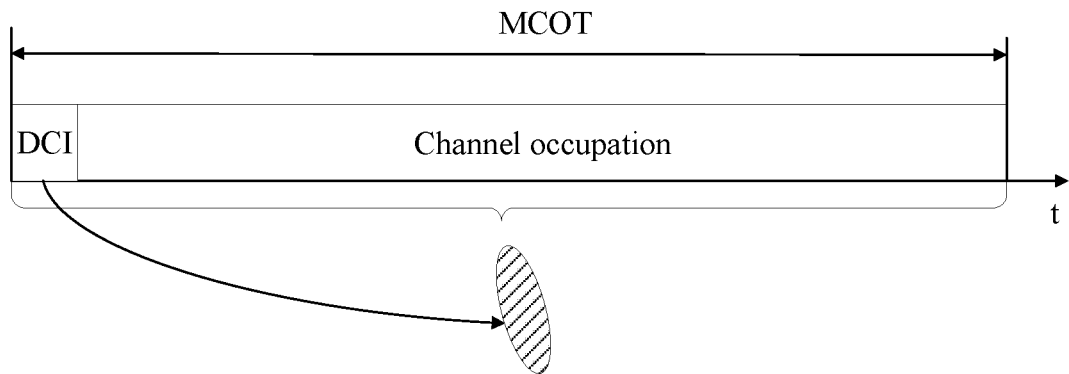
FIG. 8 is a schematic diagram of control information carrying indication information according to embodiments of the present application respectively.

For another example, as shown in FIG. 8, in the COT sharing scenario, DCI (e.g. DCI format (format) 2_0) used for indicating the COT information carries the indication information, wherein the indication information is used for indicating the spatial information (e.g. the direction of LBT) of channel listening during a COT duration, and the indication information may, for example, indicate the spatial information (e.g. the direction of LBT) of channel listening through the SSB index.

Figure 9:
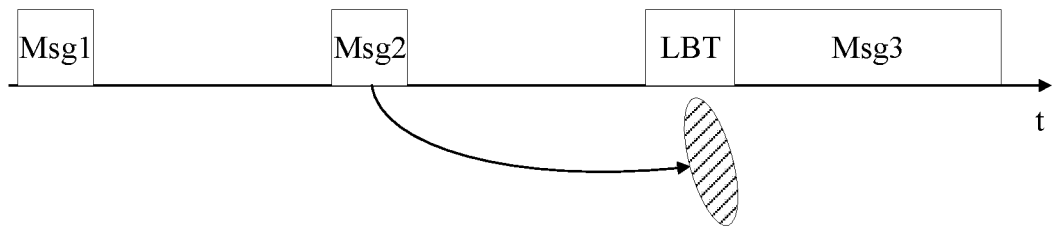
FIG. 9 is a schematic diagram of control information carrying indication information according to embodiments of the present application respectively.

As another example, as shown in FIG. 9, in a four-step random access procedure, the terminal device sends first information (message 1, Msg 1) in the four-step random access, and after receiving the Msg 1, the network device send corresponding information Msg 2, and carries, in the Msg 2, a time-frequency resource for third information (message 3, Msg 3) to be sent by the terminal device in the four-step random access, and the Msg 2 carries the indication information. The indication information is used for indicating the spatial information (e.g. the direction of LBT) of channel listening before the Msg 3 is sent, and the indication information may, for example, indicate the spatial information (e.g. the direction of LBT) of channel listening through the spatial information of the uplink SRS.

Figure 10:
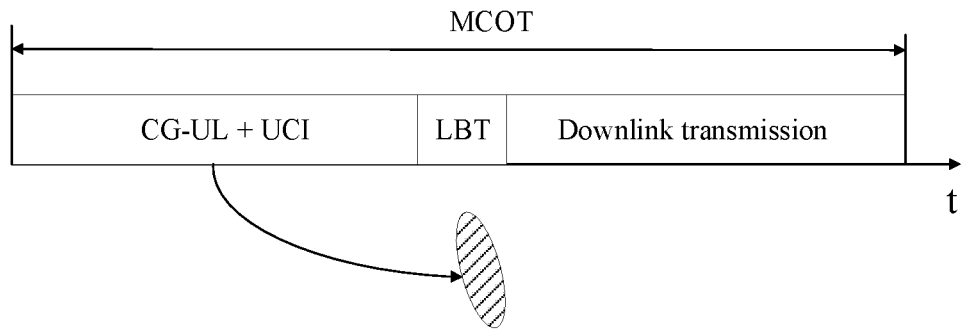
FIG. 10 is a schematic diagram of control information carrying indication information according to embodiments of the present application respectively.

For another example, as shown in FIG. 10, in the COT sharing scenario, the terminal device includes the indication information in the UCI carried in the CG-UL, wherein the indication information is used for indicating the spatial information of channel listening (such as the direction of LBT) before downlink transmission is started, and the indication information may, for example, indicate the spatial information (such as the direction of LBT) of channel listening through the spatial information of the CSI-RS. After receiving the indication information, the network device determines, according to the indication information, the direction of LBT performed before the downlink transmission is started.

Optionally, in an embodiment of the present application, the at least one type of spatial information may be determined or selected from the multiple types of spatial information with one or more of the solutions described in Examples 1 to 3 below.

Example 1, the at least one type of spatial information is determined from the multiple types of spatial information based on a type of first information.

Optionally, in the Example 1, spatial information corresponding to different types of first information is different, or spatial information corresponding to different types of first information is the same.

For example, in a case that the first information is the PDCCH, the at least one type of spatial information is the SSB index information, and in a case that the first information is the PDSCH, the at least one type of spatial information is also the SSB index information. That is, spatial information corresponding to different types of first information is the same.

For another example, in a case that the first information is the PDCCH, the at least one type of spatial information is the TCI state identification, and in a case that the first information is the PDSCH, the at least one type of spatial information is also the TCI state identification. That is, spatial information corresponding to different types of first information is the same.

For another example, in a case that the first information is the PDCCH, the at least one type of spatial information is the spatial information of the CSI-RS, and in a case that the first information is the PDSCH, the at least one type of spatial information is also the spatial information of the CSI-RS.

That is, spatial information corresponding to different types of first information is the same.

For another example, in a case that the first information is the PDCCH, the at least one type of spatial information is the SSB index information, and in a case that the first information is the PDSCH, the at least one type of spatial information is the TCI state identification. That is, spatial information corresponding to different types of first information is different.

For another example, in a case that the first information is the PDCCH, the at least one type of spatial information is the SSB index information, and in a case that the first information is the PDSCH, the at least one spatial information is the spatial information of the CSI-RS. That is, spatial information corresponding to different types of first information is different.

For another example, in a case that the first information is the PDCCH, the at least one type of spatial information is the TCI state identification, and in a case that the first information is the PDSCH, the at least one type of spatial information is the spatial information of the CSI-RS. That is, spatial information corresponding to different types of first information is different.

For another example, in a case that the first information is the PUCCH, the at least one type of spatial information is the spatial information of the uplink SRS, and in a case that the first information is the PUSCH, the at least one type of spatial information is the spatial information of the PUSCH. That is, spatial information corresponding to different types of first information is different.

For another example, in a case that the first information is the PUCCH, the at least one type of spatial information is the spatial information of the PUCCH, and in a case that the first information is the PUSCH, the at least one type of spatial information is the spatial information of the PUSCH. That is, spatial information corresponding to different types of first information is different.

Example 2, the at least one type of spatial information is determined from the multiple types of spatial information based on a type of a link carrying the information to be sent.

Optionally, the type of the link may include an uplink and a downlink.

Optionally, in the Example 2, spatial information corresponding to the first information carried by different types of links is different, or spatial information corresponding to the first information carried by the different types of links is the same.

For example, in a case that the link carrying the first information is the uplink, the at least one type of spatial information is an SSB index, and in a case that the link carrying the first information is the downlink, the at least one type of spatial information is also the SSB index. That is, spatial information corresponding to the first information carried by different types of links is the same.

For another example, in a case that the link carrying the first information is the uplink, the at least one type of spatial information is the SSB index, and in a case that the link carrying the first information is the downlink, the at least one type of spatial information is the TCI state identification. That is, spatial information corresponding to the first information carried by different types of links is different.

For another example, in a case that the link carrying the first information is the uplink, the at least one type of spatial information is the spatial information of the uplink SRS, and in a case that the link carrying the first information is the downlink, the at least one type of spatial information is the TCI state identification. That is, spatial information corresponding to the first information carried by different types of links is different.

For another example, in a case that the link carrying the first information is the uplink, the at least one type of spatial information is the spatial information of the uplink SRS, and in a case that the link carrying the first information is the downlink, the at least one type of spatial information is the candidate SSB index. That is, spatial information corresponding to the first information carried by different types of links is different.

For another example, in a case that the link carrying the first information is the uplink, the at least one type of spatial information is the spatial information of the PUCCH, and in a case that the link carrying the first information is the downlink, the at least one type of spatial information is the candidate SSB index. That is, spatial information corresponding to the first information carried by different types of links is different.

For another example, in a case that the link carrying the first information is the uplink, the at least one type of spatial information is the spatial information of the PUSCH, and in a case that the link carrying the first information is the downlink, the at least one type of spatial information is the candidate SSB index. That is, spatial information corresponding to the first information carried by different types of links is different.

Example 3, the at least one type of spatial information is determined from the multiple types of spatial information based on a type of control information carrying the first information.

Optionally, in the Example 3, spatial information corresponding to first information carried by different types of control information is different, or spatial information corresponding to first information carried by the different types of control information is the same.

For example, in a case that the control information carrying the first information is the DCI used for uplink grant, the at least one type of spatial information is the SSB index, and in a case that the control information carrying the first information is the uplink control information carried in the configured grant uplink, the at least one type of spatial information is also the SSB index. That is, spatial information corresponding to first information carried by different types of control information is the same.

For another example, in a case that the control information carrying the first information is the DCI used for uplink grant, the at least one type of spatial information is the SSB index, and in a case that the control information carrying the first information is the uplink control information carried in the configured grant uplink, the at least one type of spatial information is the TCI state identification. That is, spatial information corresponding to first information carried by different types of control information is different.

For another example, in a case that the control information carrying the first information is the DCI used for indicating the COT information, the at least one type of spatial information is the candidate SSB index, and in a case that the control information carrying the first information is the Msg2, the at least one type of spatial information is the spatial information of the uplink SRS. That is, spatial information corresponding to the first information carried by different types of control information is different.

Optionally, in the above Examples 1 to 3, the first information is information to be sent, and the first information includes a channel and/or a signal.

Therefore, in the embodiment of the present application, the indication information is used for indicating the spatial information of channel listening by at least one type of spatial information from multiple types of spatial information, so that the indicated channel listening direction is more reasonable and accurate. Furthermore, performing channel listening based on the spatial information of channel listening may reduce interference of channel transmission, and improve the success rate of channel access.

Method embodiments of the present application are described in detail above with reference to FIGS. 4 to 10, device embodiments of the present application will be described in detail below with reference to FIGS. 11 to 16. It should be understood that the device embodiments and the method embodiments correspond to each other, and description of the method embodiments may be referred to for similar description of the device embodiments.

Figure 11:
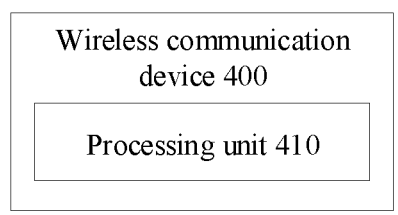
FIG. 11 is a schematic block diagram of a wireless communication device according to an embodiment of the present application.

FIG. 11 shows a schematic block diagram of a wireless communication device 400 according to an embodiment of the present application. As shown in FIG. 11, the wireless communication device 400 includes a processing unit 410.

The processing unit 410 is configured to determine spatial information of channel listening according to spatial information corresponding to first information, wherein the first information includes a channel and/or a signal.

Optionally, the spatial information corresponding to the first information includes at least one of the followings: Synchronization Signal Block (SSB) index information, a Transmission Configuration Indicator (TCI) state identification, spatial information of a Channel State Information Reference Signal (CSI-RS), spatial information of an uplink Sounding Reference Signal (SRS), spatial information of a Physical Uplink Control Channel (PUCCH), or spatial information of a Physical Uplink Shared Channel (PUSCH).

Optionally, the SSB index information includes at least one of the followings: an SSB index, or a candidate SSB index.

Optionally, in multiple SSBs occupying different resources in the time domain, SSBs with a same SSB index have a Quasi-co-located (QCL) relationship, and SSBs having the QCL relationship correspond to a same direction of LBT.

Optionally, in multiple candidate SSB indices, candidate SSB indices corresponding to a same SSB index have a QCL relationship, and candidate SSB indices having the QCL relationship are used for determining a same direction of LBT.

Optionally, the TCI state identification is an identification of an activated TCI state.

Optionally, the TCI state identified by the TCI state identification is configured with QCL information.

Optionally, the spatial information of the CSI-RS corresponds to a CSI-RS resource identification; or, the spatial information of the uplink SRS corresponds to an uplink SRS resource indicator; or, the spatial information of the PUCCH corresponds to a PUCCH resource identification.

Optionally, the spatial information of the PUSCH is indicated by at least one of an SRS resource indicator, precoding information, information of the number of layers, or a Scheduling Request Indication (SRI).

Optionally, the processing unit is specifically configured to determine the spatial information of channel listening according to spatial information of the first information or spatial information corresponding to a type of the first information.

Optionally, each type of first information corresponds to one type of spatial information; and/or, multiple types of first information correspond to one type of spatial information.

Optionally, the spatial information of channel listening includes a direction of uplink Listen Before Talk (LBT) and a direction of downlink LBT. A type of spatial information used for determining the direction of uplink LBT is the same as a type of spatial information used for determining the direction of downlink LBT; or, a type of spatial information used for determining the direction of uplink LBT is different from a type of spatial information used for determining the direction of downlink LBT.

Optionally, the first information is information to be sent.

Optionally, in some embodiments, the processing unit may be one or more processors.

It should be understood that the wireless communication device 400 according to the embodiment of the present application may correspond to the transmitter device in the method embodiment of the present application, and the above-mentioned and other operations and/or functions of various units in the wireless communication device 400 are respectively for implementing the corresponding flows of the transmitter device in the method 200 shown in FIG. 4, and will not be repeated here again for the sake of brevity.

Figure 12:
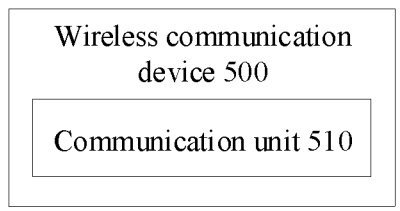
FIG. 12 is a schematic block diagram of another wireless communication device according to an embodiment of the present application.

FIG. 12 shows a schematic block diagram of a wireless communication device 500 according to an embodiment of the present application. As shown in FIG. 12, the wireless communication device 500 includes a communication unit 510.

The communication unit 510 is configured to send indication information to a receiver device, wherein the indication information is used for indicating spatial information of channel listening through at least one type of spatial information from multiple types of spatial information.

Optionally, the at least one type of spatial information is determined from the multiple types of spatial information based on a type of first information.

Optionally, spatial information corresponding to different types of first information is different, or spatial information corresponding to different types of first information is the same.

Optionally, the at least one type of spatial information is determined from the multiple types of spatial information based on a type of a link carrying the first information.

Optionally, spatial information corresponding to the first information carried by different types of links is different, or spatial information corresponding to the first information carried by the different types of links is the same.

Optionally, the at least one type of spatial information is determined from the multiple types of spatial information based on a type of control information carrying the first information.

Optionally, spatial information corresponding to first information carried by different types of control information is different, or spatial information corresponding to first information carried by the different types of control information is the same.

Optionally, the first information is information to be sent, and the first information includes a channel and/or a signal.

Optionally, the multiple types of spatial information include at least two of the followings: SSB index information, a TCI state identification, spatial information of a CSI-RS, spatial information of an uplink SRS, spatial information of a PUCCH, or spatial information of a PUSCH.

Optionally, the SSB index information includes at least one of the followings: an SSB index, or a candidate SSB index.

Optionally, in multiple SSBs occupying different resources in the time domain, SSBs with the same SSB index have a Quasi-co-located (QCL) relationship, and SSBs having the QCL relationship correspond to a same direction of LBT.

Optionally, in multiple candidate SSB indices, candidate SSB indices corresponding to the same SSB index have a QCL relationship, and candidate SSB indices having the QCL relationship indicate a same direction of LBT.

Optionally, the TCI state identification is an identification of an activated TCI state.

Optionally, a TCI state configuration identified by the TCI state identification includes QCL information.

Optionally, the spatial information of the CSI-RS corresponds to a CSI-RS resource identification; or, the spatial information of the uplink SRS corresponds to an uplink SRS resource indicator; or, the spatial information of the PUCCH corresponds to a PUCCH resource identification.

Optionally, the spatial information of the PUSCH is indicated by at least one of an SRS resource indicator, precoding information, information of the number of layers, or a Scheduling Request Indication (SRI).

Optionally, the indication information is carried in at least one of the following information: DCI used for uplink grant, DCI used for indicating COT information, second information in a four-step random access, or uplink control information carried in a configured grant uplink.

Optionally, in some embodiments, the communication unit may be a communication interface or transceiver, or an input/output interface of a communication chip or a system on chip.

It should be understood that the wireless communication device 500 according to the embodiment of the present application may correspond to the transmitter device in the method embodiment of the present application, and the above-mentioned and other operations and/or functions of various units in the wireless communication device 500 are respectively for implementing the corresponding flows of the transmitter device in the method 300 shown in FIG. 6, and will not be repeated here again for the sake of brevity.

Figure 13:
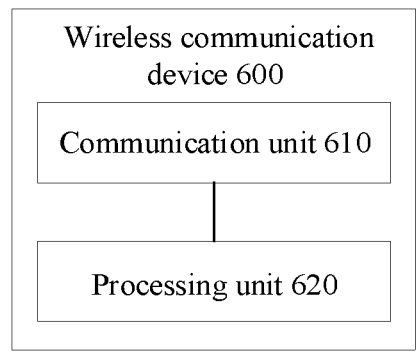
FIG. 13 is a schematic block diagram of still another wireless communication device according to an embodiment of the present application.

FIG. 13 shows a schematic block diagram of a wireless communication device 600 according to an embodiment of the present application. As shown in FIG. 13, the wireless communication device 600 includes a communication unit 610 and a processing unit 620.

The communication unit 610 is configured to receive indication information sent by a transmitter device, wherein the indication information is used for indicating spatial information of channel listening through at least one type of spatial information from multiple types of spatial information.

The processing unit 620 is configured to determine the spatial information of channel listening according to the indication information.

Optionally, the at least one type of spatial information is determined from the multiple types of spatial information based on a type of first information.

Optionally, spatial information corresponding to different types of first information is different, or spatial information corresponding to different types of first information is the same.

Optionally, the at least one type of spatial information is determined from the multiple types of spatial information based on a type of a link carrying the first information.

Optionally, spatial information corresponding to the first information carried by different types of links is different, or spatial information corresponding to the first information carried by the different types of links is the same.

Optionally, the at least one type of spatial information is determined from the multiple types of spatial information based on a type of control information carrying the first information.

Optionally, spatial information corresponding to first information carried by different types of control information is different, or spatial information corresponding to first information carried by different types of control information is the same.

Optionally, the first information is information to be sent, and the first information includes a channel and/or a signal.

Optionally, the multiple types of spatial information include at least two of the followings: Synchronization Signal Block (SSB) index information, a Transmission Configuration Indicator (TCI) state identification, spatial information of a Channel State Information Reference Signal (CSI-RS), spatial information of an uplink Sounding Reference Signal (SRS), spatial information of a Physical Uplink Control Channel (PUCCH), or spatial information of a Physical Uplink Shared Channel (PUSCH).

Optionally, the SSB index information includes at least one of the followings: an SSB index, or a candidate SSB index.

Optionally, in multiple SSBs occupying different resources in the time domain, SSBs with the same SSB index have a Quasi-co-located (QCL) relationship, and SSBs having the QCL relationship correspond to a same direction of LBT.

Optionally, in multiple candidate SSB indices, candidate SSB indices corresponding to the same SSB index have a QCL relationship, and candidate SSB indices having the QCL relationship indicate a same direction of LBT.

Optionally, the TCI state identification is an identification of an activated TCI state.

Optionally, a TCI state configuration identified by the TCI state identification includes QCL information.

Optionally, the spatial information of the CSI-RS corresponds to a CSI-RS resource identification; or, the spatial information of the uplink SRS corresponds to an uplink SRS resource indicator; or, the spatial information of the PUCCH corresponds to a PUCCH resource identification.

Optionally, the spatial information of the PUSCH is indicated by at least one of an SRS resource indicator, precoding information, information of the number of layers, or a Scheduling Request Indication (SRI).

Optionally, the indication information is carried in at least one of the following information: Downlink Control Information (DCI) used for uplink grant, DCI used for indicating Channel Occupancy Time (COT) information, second information in a four-step random access, or uplink control information carried in a configured grant uplink.

Optionally, in some embodiments, the communication unit may be a communication interface or transceiver, or an input/output interface of a communication chip or a system on chip. The above processing unit may be one or more processors.

It should be understood that the wireless communication device 600 of the embodiment of the present application may correspond to the transmitter device in the method embodiment of the present application, and the above-mentioned and other operations and/or functions of various units in the wireless communication device 600 are respectively for implementing the corresponding flows of the receiver device in the method 300 shown in FIG. 6, and will not be repeated here again for the sake of brevity.

Figure 14:
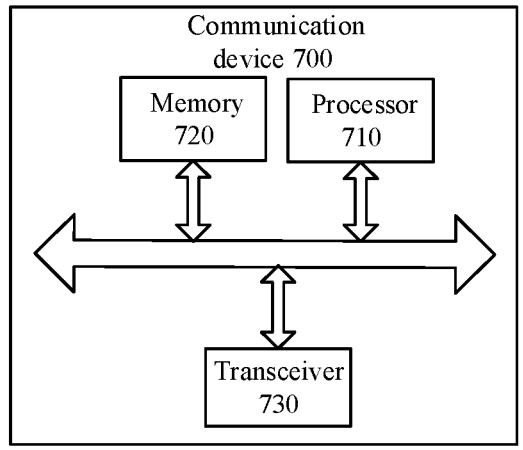
FIG. 14 is a schematic block diagram of a communication device according to an embodiment of the present application.

FIG. 14 is a schematic diagram of a structure of a communication device 700 according to an embodiment of the present application. The communication device 700 shown in FIG. 14 includes a processor 710, wherein the processor 710 may call and run a computer program from a memory to implement the method in the embodiment of the present application.

Optionally, as shown in FIG. 14, the communication device 700 may further include a memory 720. The processor 710 may call and run a computer program from the memory 720 to implement the method in the embodiment of the present application.

The memory 720 may be a separate device independent of the processor 710, or may be integrated in the processor 710.

Optionally, as shown in FIG. 14, the communication device 700 may further include a transceiver 730, and the processor 710 may control the transceiver 730 to communicate with another device. Specifically, the transceiver 730 may send information or data to another device or receive information or data sent by another device.

The transceiver 730 may include a transmitter and a receiver. The transceiver 730 may further include antennas, a quantity of which may be one or more.

Optionally, the communication device 700 may be specifically the transmitter device of the embodiment of the present application, and the communication device 700 may implement the corresponding flows implemented by the transmitter device in various methods of the embodiments of the present application, which will not be repeated here again for the sake of brevity.

Optionally, the communication device 700 may be specifically the receiver device of the embodiment of the present application, and the communication device 700 may implement the corresponding flows implemented by the receiver device in various methods of the embodiments of the present application, which will not be repeated here again for the sake of brevity.

Figure 15:
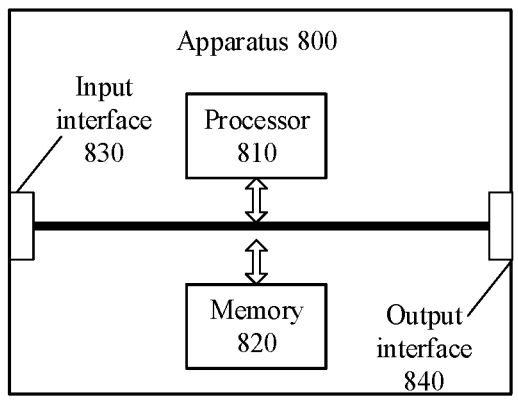
FIG. 15 is a schematic block diagram of an apparatus according to an embodiment of the present application.

FIG. 15 is a schematic diagram of a structure of an apparatus according to an embodiment of the present application. The apparatus 800 shown in FIG. 15 includes a processor 810. The processor 810 may call and run a computer program from a memory to implement the method in the embodiment of the present application.

Optionally, as shown in FIG. 15, the apparatus 800 may further include a memory 820. The processor 810 may call and run a computer program from the memory 820 to implement the method in the embodiment of the present application.

The memory 820 may be a separate device independent of the processor 810, or may be integrated in the processor 810.

Optionally, the apparatus 800 may further include an input interface 830. The processor 810 may control the input interface 830 to communicate with another device or chip. Specifically, the processor 810 may acquire information or data sent by another device or chip.

Optionally, the apparatus 800 may further include an output interface 840. The processor 810 may control the output interface 840 to communicate with another device or chip. Specifically, the processor 810 may output information or data to another device or chip.

Optionally, the apparatus may be applied to the transmitter device in the embodiment of the present application, and the apparatus may implement the corresponding flows implemented by the transmitter device in various methods of the embodiments of the present application, which will not be repeated here again for the sake of brevity.

Optionally, the apparatus may be applied to the receiver device in the embodiment of the present application, and the apparatus may implement the corresponding flows implemented by the receiver device in various methods of the embodiments of the present application, which will not be repeated here again for the sake of brevity.

Optionally, the apparatus mentioned in an embodiment of the present application may also be a chip. For example, it may be a system-level chip, a system chip, a chip system, or a system on chip, etc.

Figure 16:
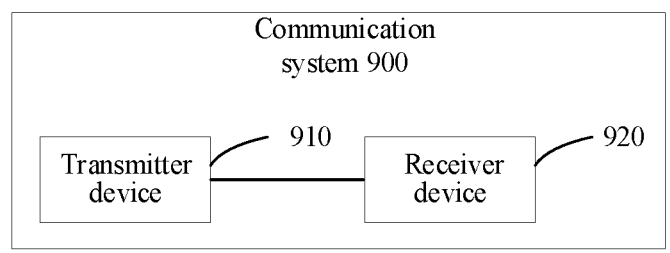
FIG. 16 is a schematic block diagram of a communication system according to an embodiment of the present application.

FIG. 16 is a schematic block diagram of a communication system 900 according to an embodiment of the present application. As shown in FIG. 16, the communication system 900 includes a transmitter device 910 and a receiver device 920.

Herein, the transmitter device 910 may be configured to implement corresponding functions implemented by the transmitter device in the above-mentioned methods, and the receiver device 920 may be configured to implement corresponding functions implemented by the receiver device in the above-mentioned methods, which will not be repeated here again for the sake of brevity.

It should be understood that the processor in the embodiments of the present application may be an integrated circuit chip with a capability for processing signals. In an implementation process, various acts of the method embodiments described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement or perform various methods, acts, and logic block diagrams disclosed in the embodiments of the present application. The general purpose processor may be a microprocessor or the processor may be any conventional processor or the like. The acts of the methods disclosed in connection with the embodiments of the present application may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and a processor reads information in the memory and completes the acts of the above methods in combination with its hardware.

It should be understood that the memory in the embodiments of the present application may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration but should not be construed as limitations. For example, the memory in the embodiments of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is to say, the memories in the embodiments of the present application are intended to include, but are not limited to, these and any other suitable types of memories.

An embodiment of the present application further provides a computer readable storage medium, configured to store a computer program.

Optionally, the computer readable storage medium may be applied to the transmitter device in the embodiment of the present application, and the computer program enables a computer to perform the corresponding flows implemented by the transmitter device in various methods of the embodiments of the present application, which will not be repeated here again for the sake of brevity.

Optionally, the computer readable storage medium may be applied to the receiver device in the embodiment of the present application, and the computer program enables the computer to perform the corresponding flows implemented by the receiver device in various methods of the embodiments of the present application, which will not be repeated here again for the sake of brevity.

An embodiment of the present application further provides a computer program product, including computer program instructions.

Optionally, the computer program product may be applied to the transmitter device in the embodiment of the present application, and the computer program instructions enable a computer to perform the corresponding flows implemented by the transmitter device in various methods of the embodiments of the present application, which will not be repeated here again for the sake of brevity.

Optionally, the computer program product may be applied to the receiver device in the embodiment of the present application, and the computer program instructions enable the computer to perform the corresponding flows implemented by the receiver device in various methods of the embodiments of the present application, which will not be repeated here again for the sake of brevity.

An embodiment of the present application further provides a computer program.

Optionally, the computer program may be applied to the transmitter device in the embodiment of the present application. When run on a computer, the computer program enables the computer to perform the corresponding flows implemented by the transmitter device in various methods according to the embodiments of the present application, which will not be repeated here again for the sake of brevity.

Optionally, the computer program may be applied to the receiver device in the embodiment of the present application. When run on a computer, the computer program enables the computer to perform the corresponding flows implemented by the receiver device in various methods of the embodiments of the present application, which will not be repeated here again for the sake of brevity.

Those of ordinary skills in the art will recognize that units and algorithm acts of various examples described in connection with the embodiments disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present application.

Those skilled in the art may clearly understand that for convenience and conciseness of description, specific working processes of the systems, apparatuses, and units described above may refer to corresponding processes in the aforementioned method embodiments, and details thereof will not be repeated here.

In several embodiments according to the present application, it should be understood that the disclosed systems, apparatuses, and methods may be implemented in other ways. For example, the apparatus embodiments described above are only exemplary. For example, a division of the units is only a division of logical functions, but there may be other division manners in actual implementations. For example, multiple units or components may be combined or integrated into another system, or some features may be ignored or not executed. In addition, mutual coupling or direct coupling or communication connection shown or discussed may be indirect coupling or communication connection between apparatuses or units through some interfaces, and may be in electrical, mechanical, or in other forms.

The units described as separated components may or may not be physically separated, and components shown as units may or may not be physical units, i.e., they may be located in one place or may be distributed over multiple network units. Some or all of the units may be selected according to practical needs to achieve purposes of solutions of the embodiments.

In addition, various functional units in various embodiments of the present application may be integrated in one processing unit, or various units may be physically and separately present, or two or more units may be integrated in one unit.

The functions may be stored in a computer readable storage medium if implemented in a form of a software functional unit and sold or used as a separate product. Based on such understanding, a technical solution of the present application, in essence, or a part contributing to the prior art, or a part of the technical solution, may be embodied in a form of a software product. The computer software product is stored in a storage medium, and includes several instructions for enabling a computer device (which may be a personal computer, a server, or a network device, or the like) to perform all or part of the acts of the methods described in various embodiments of the present application. And the aforementioned storage medium includes: various media, such as a U disk, a mobile hard disk, a Read-Only Memory (ROM), a Random Access Memory (RAM), a magnetic disk, or an optical disk, etc., which may store program codes.

The foregoing are merely specific embodiments of the present application, but the protection scope of the present application is not limited thereto. Any person skilled in the art may readily conceive variations or substitutions within the technical scope disclosed by the present application, which should be included within the protection scope of the present application. Therefore, the protection scope of the present application should be subject to the protection scope of claims.

The invention claimed is:

1. A method for wireless communication, comprising:
   determining, by a transmitter device, spatial information of channel listening according to spatial information corresponding to first information to be sent, wherein the first information comprises a channel and/or a signal;
   wherein the spatial information of channel listening comprises a direction of uplink Listen Before Talk (LBT) and a direction of downlink LBT, wherein
   a type of spatial information used for determining the direction of uplink LBT is different from a type of spatial information used for determining the direction of downlink LBT;
   wherein the spatial information corresponding to the first information to be sent comprises at least one of the followings:
   Synchronization Signal Block (SSB) index information, a Transmission Configuration Indicator (TCI) state identification, spatial information of an uplink Sounding Reference Signal (SRS) spatial information of a Physical Uplink Control Channel (PUCCH), or spatial information of a Physical Uplink Shared Channel (PUSCH); wherein the spatial information of the uplink SRS corresponds to an uplink SRS resource indicator, the spatial information of the PUSCH is indicated by at least one of precoding information, or information of the number of layers.

2. The method of claim 1, wherein the TCI state identification is an identification of an activated TCI state.

3. The method of claim 1, wherein a TCI state identified by the TCI state identification is configured with QCL information.

4. The method of claim 1, wherein the spatial information of the PUSCH is further indicated by an SRS resource indicator.

5. The method of claim 1, wherein determining, by the transmitter device, the spatial information of channel listening according to the spatial information corresponding to the first information, comprises:
   determining, by the transmitter device, the spatial information of channel listening according to spatial information of the first information.

6. A method for wireless communication, comprising:
   receiving, by a receiver device, indication information sent by a transmitter device, wherein the indication information is used for indicating spatial information of channel listening through at least one type of spatial information from a plurality of types of spatial information, wherein the at least one type of spatial information is determined from the plurality of types of spatial information based on a type of first information, wherein the first information is information to be sent by the transmitter device, and the first information comprises a channel and/or a signal; and
   determining, by the receiver device, the spatial information of channel listening according to the indication information;
   wherein the spatial information of channel listening comprises a direction of uplink Listen Before Talk (LBT) and a direction of downlink LBT, wherein
   a type of spatial information used for determining the direction of uplink LBT is different from a type of spatial information used for determining the direction of downlink LBT;
   wherein the plurality of types of spatial information comprise:
   a Transmission Configuration Indicator (TCI) state identification, and spatial information of an uplink Sounding Reference Signal (SRS).

7. The method of claim 6, wherein the TCI state identification is an identification of an activated TCI state.

8. The method of claim 6, wherein a TCI state configuration identified by the TCI state identification comprises QCL information.

9. The method of claim 6, wherein,
   the spatial information of the uplink SRS corresponds to an uplink SRS resource indicator.

10. The method of claim 6, wherein the indication information is carried in Downlink Control Information (DCI) used for uplink grant.

11. A wireless communication device, comprising:
    a processor, configured to determine spatial information of channel listening according to spatial information corresponding to first information to be sent, wherein the first information comprises a channel and/or a signal;
    wherein the spatial information of channel listening comprises a direction of uplink Listen Before Talk (LBT) and a direction of downlink LBT, wherein
    a type of spatial information used for determining the direction of uplink LBT is different from a type of spatial information used for determining the direction of downlink LBT;
    wherein the spatial information corresponding to the first information to be sent comprises at least one of the followings:
    Synchronization Signal Block (SSB) index information, a Transmission Configuration Indicator (TCI) state identification, spatial information of an uplink Sounding Reference Signal (SRS) spatial information of a Physical Uplink Control Channel (PUCCH), or spatial information of a Physical Uplink Shared Channel (PUSCH); wherein the spatial information of the uplink SRS corresponds to an uplink SRS resource indicator, the spatial information of the PUSCH is indicated by at least one of precoding information, or information of the number of layers.

12. A wireless communication device, comprising:
    a transceiver, configured to receive indication information sent by a transmitter device, wherein the indication information is used for indicating spatial information of channel listening through at least one type of spatial information from a plurality of types of spatial information, wherein the at least one type of spatial information is determined from the plurality of types of spatial information based on a type of first information, wherein the first information is information to be sent by the transmitter device, and the first information comprises a channel and/or a signal; and
    a processor, configured to determine the spatial information of channel listening according to the indication information;
    wherein the spatial information of channel listening comprises a direction of uplink Listen Before Talk (LBT) and a direction of downlink LBT, wherein a type of spatial information used for determining the direction of uplink LBT is different from a type of spatial information used for determining the direction of downlink LBT;

wherein the plurality of types of spatial information comprise:

a Transmission Configuration Indicator (TCI) state identification, and spatial information of an uplink Sounding Reference Signal (SRS).

* * * * *